Aug. 31, 1926.
P. DODGE
1,597,774
TEMPERATURE REGULATION
Filed July 8, 1925  2 Sheets-Sheet 1
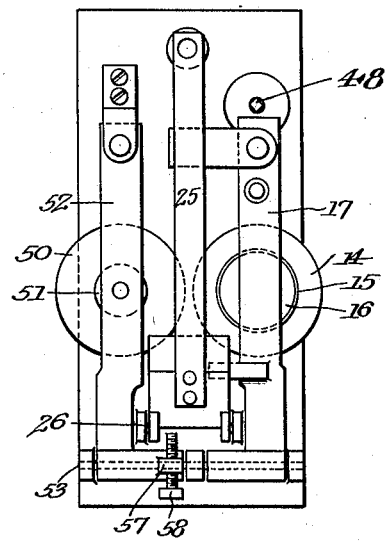
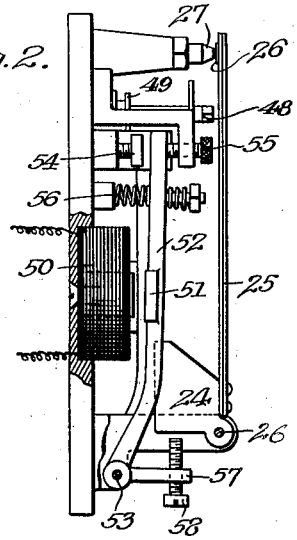
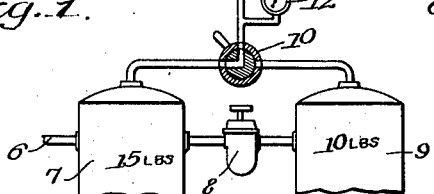

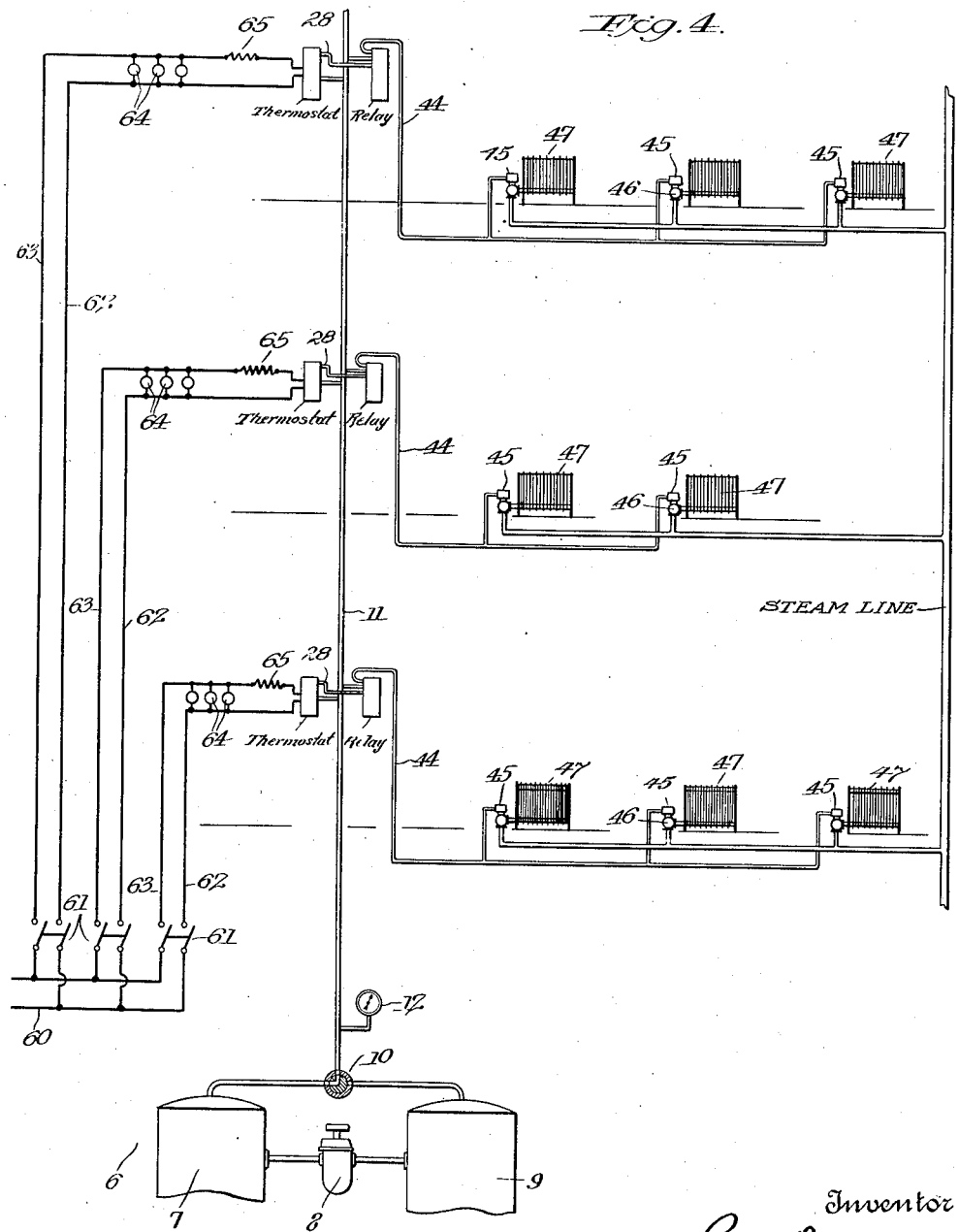

Patented Aug. 31, 1926.

1,597,774

UNITED STATES PATENT OFFICE.

PARKER DODGE, OF SOMERSET, MARYLAND, ASSIGNOR TO JOHNSON SERVICE COMPANY, OF MILWAUKEE, WISCONSIN, A CORPORATION OF WISCONSIN.

TEMPERATURE REGULATION.

Application filed July 8, 1925. Serial No. 42,252.

This invention relates to temperature regulation and particularly to thermostats of the selective night setting type.

A large number of buildings, notably school buildings, are used to capacity throughout the day and only to part capacity at night. In order to economize heat during the night session those rooms which are not in use are not heated to the full day temperature, but are maintained at a lower temperature. Prior to my invention it has been the practice in certain installations to add to the thermostat a secondary mechanism which responded to the intensity of supply pressure of the motive fluid to actuate the relay valve of the thermostat. This secondary mechanism was subject to the control of a hold-out device which rendered it active or inactive. When active, a reduction of the motive fluid pressure operated to set the thermostat to maintain the low temperature. When held inactive, the thermostat operated to maintain the normal day temperature, even though the pressure of the motive fluid was reduced.

Other systems for accomplishing similar results have also been devised, but each of them involves the manual setting of the secondary device or hold-out on the thermostat in each room. In cases where different groups of rooms are used on successive nights, it is necessary that some one adjust the thermostats from day to day.

The object of the present invention is to overcome this necessity for adjustment by applying to this particular problem a modified form of an invention which in its broader aspects is described and claimed in my co-pending application Ser. No. 41,133, filed July 2, 1925. Accordingly, the claims in the present application are restricted to the application of this special control mechanism to a thermostat of the selective night setting type.

Briefly stated, the invention contemplates the application to the thermostats of a selective night setting installation of an additional control actuated by the condition of the light circuits of the various rooms where the thermostats are. In a system equipped with the present invention, the thermostat has an auxiliary control operated from some central point, say the furnace room, which is capable of giving all of the thermostats a bias toward the high temperature day setting or toward the low temperature night setting which if unopposed determines such setting. This control of the day and night settings may be manually effected or may be controlled automatically by a clock, as is well understood. Each thermostat is further equipped with means controlled by or in harmony with the lighting of the lights in its room and serving to suspend the night setting for such room, if this be in effect, whenever the lights in the room are lighted. Consequently it is not necessary to select in advance the rooms which are to be heated to day temperature at night and manually adjust their thermostats. When the rooms are lighted for use the thermostats in the lighted rooms will be set for the day setting, even though the system as a whole be biased toward the night setting. This renders the system completely automatic.

If, on a holiday or Sunday while the system is biased toward the night temperature during the day-time, it is desired to use, say, one room during the day without lighting the lights, a manual setting of the thermostat in that particular room may be made in order to secure the day temperature, but aside from this no manual setting is necessary under any conditions.

The invention is capable of embodiment in various types of heating system and may be applied whether the lighting circuits in the room are controlled by switches in the room itself or by master switches at some other point. For purposes of illustration I show it embodied in the common type of installation in which the room is heated by direct radiation in the room and in which a thermostat of the pneumatic relay motor type operates to open and close radiator valves.

Referring to the drawings,

Fig. 1 is a diagram of the system showing in right side elevation the thermostat and the relay for a single room;

Fig. 2 is a left side elevation of the thermostat mechanism proper;

Fig. 3 is a front elevation of the same; and

Fig. 4 is a diagram showing the connections for three rooms.

The thermostat chosen for illustration is of the familiar pressure fluid operated type which has a leak port controlled by a thermostatic valve, the leak port, as it is opened and closed by the thermostatic valve, causing the collapse or distention of the relay motor diaphragm which shifts a valve controlling the radiator valve to turn the heat on and off. The pressure fluid, usually air, is supplied through a pipe 6 to the tank 7 and the supply is automatically controlled in a familiar manner to maintain in the tank 7 a uniform pressure, say fifteen pounds per square inch. Connected to the tank 7 through a reducing valve 8 is a second tank 9 and this, through the action of the reducing valve 8, is maintained charged at a lower pressure than the tank 7, say ten pounds per square inch.

A three-way valve 10 serves to connect either the tank 7 or the tank 9 with the pressure supply line 11, which feeds the thermostats, so as to supply to this line pressure fluid at either fifteen pounds or ten pounds pressure, as may be desired. The valve is shown set to maintain the higher pressure on the line 11. The pressure on the line is shown by the gauge 12. The supply line 11 has a branch 13 which leads to the selective control diaphragm chamber 14 which operates through a diaphragm 15 and saucer or bearer plate 16 to shift the selective control lever 17 against the resistance of the spring 18.

The spring 18 is adjusted by a nut 19 on the stem 20 to such a stress that when the higher pressure, say fifteen pounds, is on the line 11, the spring 18 is overpowered by the diaphragm 15, while when the lower pressure, say ten pounds, is on the line, the spring 18 overpowers the diaphragm 15. The selective control lever 17 is limited in its movements by adjustable capstan screws 21 and 22 and it carries a boss 23 which engages the weighted saddle 24 on which the thermostatic element, in this case a bi-metallic bar 25, is mounted. The saddle 24 is pivoted at 26 and the capstan screws 21 and 22 are so adjusted that the screw 21 determines the high temperature or day adjustment of the thermostatic bar 25, and the screw 22 determines the low temperature or night adjustment thereof.

The bar 25 is provided with a valve member 26 which coacts with the usual leak port 27. This leak port 27 is connected by a pipe 28 and a port 29 with a diaphragm chamber 30 forming part of the relay motor. The chamber 30 acts through a bearer plate 31 to shift a lever 32 about its pivot 33. The diaphragm chamber 30 when inflated acts against the resistance of a coiled spring 34 which restores the parts when the diaphragm is deflated. The motion of the lever 32 is limited by an adjustable stop screw 35.

The diaphragm chamber 30 is constantly supplied with compressed air from the main line 11 through a port 36 in which there is a restricting needle valve 37. The needle valve is so set that it supplies air to the diaphragm chamber 30 at a rate less than the rate of outflow through the leak port 27. Thus when the leak port 27 is opened by the thermostatic bar 25 and its valve 26, the diaphragm chamber 30 collapses. But when the leak port 27 is closed, the diaphragm chamber 30 is distended by the accumulation of pressure flowing past the needle valve 37.

The lever 32 actuates through a quick throw mechanism a relay valve 38. This valve 38 coacts with two ported seats, the first of which, 39, has a port connected to the supply line 11, and the second of which, 40, has a port surrounding the valve stem 41 and leading to the atmosphere. The quick throw mechanism consists of a globular head 42 which is surrounded by an annular coiled spring 43, the spring being confined in a slot-like housing formed at the upper end of the lever 32.

When the diaphragm chamber 30 is distended, the upper end of the lever 32 moves to the left and the coiled spring 43 moving past the largest part of the head 42 acts to shift the valve 38 to the right, closing the exhaust port in seat 40 and opening the supply port in seat 39 to the space surrounding the valve 38. This space is connected by a pipe 44 with the usual diaphragm motor 45. The diaphragm motor 45 is connected to the supply valve 46 of the radiator or other heating element 47 and under the conditions just suggested, closes this valve.

When the diaphragm chamber 30 is collapsed, the spring 43 is carried to the right of the largest diameter of the head 42 and acts to force this head to the left, seating the valve 38 against the seat 39 and shutting off the supply of pressure fluid to the motor 45. At the same time the valve 38 moves away from the seat 40 and opens the exhaust to atmosphere around the stem 31. Under these conditions the motor 45 will be vented and the supply valve 46 will open to supply steam to the radiator 47.

A stem 48 is threaded in the base of the thermostat and carries a flange 49, which when the stem 48 is screwed outward engages the end of lever 17 and holds it in day setting.

The mechanism so far described is a known type of selective night setting thermostat. To this I add another selective control dominated by the condition of the lights in the room in which the thermostat is located.

An electromagnet 50, or the equivalent, is mounted on the base of the thermostat and coacts with an armature 51 carried by a lever 52 pivotally supported on the base at 53. The range of movement of the lever 52 is adjusted by stop screws 54 and 55. The lever 52 is urged against the stop screw 55 by a spring 56 which is overpowered by the electromagnet 50 when this is excited. It is practicable to use quite a light spring and quite a weak magnet as the work to be done is very small.

The lever 52 carries adjacent the pivot 53 a forward extending arm 57 and in this is threaded an adjusting screw 58. The adjusting screw 58 is in position to strike and lift the saddle 24 when the lever 52 is drawn inward by the magnet 50. Any suitable connections are made to excite the magnet 50 when the lights in the particular room in which the thermostats are located are lighted. The simplest way is to derive the exciting current from the lighting circuit. This may be done very easily by the use of a resistance in series with the magnet. Where alternating current is available a small transformer may be used.

In Figs. 1 and 4 the mains are shown at 60, a double pole switch at 61, and the room light circuit wires at 62, 63. The lights 64 are shown connected in parallel with each other between the wires 62 and 63. A resistance 65 is connected in series with the winding of the magnet 50 and the two are connected in parallel with the lights 64.

Referring now particularly to Fig. 1, it should be noted that the day setting is there shown. The supply line 11 is under fifteen pounds pressure and the diphragm 15 is distended so that the spring 18 is overpowered and the saddle 24 slightly lifted. The tendency is to move the valve 26 away from the leak port 27. It should be remembered that when the leak port is open the diaphragm chamber 30 is collapsed, and the valve 38 is to the left, thus venting the motor 45 and admitting steam to the radiator.

Suppose now that the lights are out and that the engineer establishes ten pounds pressure on the line 11 by shifting the valve 10. Under this condition the diaphragm 15 collapses, the spring 18 moves the lever 17 to the right, the saddle 24 is slightly lowered, and the valve 26 is urged to a position closer to the leak port 27. The effect of this is to shut off heat from the radiator 47 until a lower temperature is reached.

Suppose now that the lights in this particular room are lighted. The lever 17 is not affected, but the magnet 50 is exicted, the armature 51 is drawn in and the screw 58 strikes the saddle 24 and lifts it. Preferably the screw 58 is so adjusted that with the maximum range of movement admitted by the capstan screw 54 the saddle 24 is moved to its day adjustment position. Obviously however, the mechanism is such as to permit a different adjustment of the saddle 24 so that if for any reason it be desired, the temperature maintained when the lights are lighted may be different from the normal day temperature established through the maintenance of the fifteen pound pressure on the line 11.

In Fig. 4 the connections for three rooms are shown. It will be observed that while the primary setting controlled by the pressure of the motive fluid affects all the thermostats, each thermostat is subject to a modifying control independently of the others, and this modifying control is effected by the condition of the lights in the various rooms in which the corresponding thermostats are.

The invention may be embodied in a number of different forms. For example, the selective day and night control may be secured by other means than by the variation of the supply pressure. A number of such mechanisms have been devised and it is apparent that they may be subjected to the secondary control of the lights in a manner analogous to that described. Various types of adjustable thermostats other than the pneumatically actuated type are known and they, too, are subject to similar control. Thus while the particular embodiment illustrated is belived to posses practical advantages and is preferred, the utility of the invention is not limited, but indeed has the broadest application to selective day and night controls generally.

What is claimed is:

1. The combination of a temperature-regulating thermostat; pneumatic means for shifting said thermostat between two settings; and electrical means for maintaining one of said two settings regardless of the action of said pneumatic means.

2. The combination of a temperature-regulating thermostat; pneumatic means for shifting said thermostat between two settings; electrical means for maintaining one of said two settings regardless of the action of said pneumatic means; a lighting circuit; a circuit including said electrical means; and controlling means common to said two circuits.

3. The combination of a temperature-regulating thermostat; primary adjusting means for shifting said thermostat between two settings; secondary power-actuated adjusting means for maintaining one of said two settings regardless of the action of the primary adjusting means; and a manually adjustable stop for locking said thermostat at will in the last-named setting.

4. The combination of a temperature-regulating thermostat; pneumatic means for shifting said thermostat betwen two settings; electrical means for maintaining one of said two settings regardless of the action of said pneumatic means; a lighting circuit; a circuit including said electrical means; controlling means common to said two circuits; and manually operable means for locking said thermostat at will in the setting produced by the action of said electrical means.

5. The combination of a temperature-regulating system including a plurality of thermostats each controlling the supply of heat to a corresponding room; group adjusting means common to said thermostats for setting them to maintain different temperatures during the day and during the night; individual setting means for each thermostat capable of suspending the setting made by said group adjusting means; individual light circuits for the various rooms; and connections between the varous light circuits and corresponding individual setting means, whereby the conditions of the varous light circuits determine the settings of corresponding thermostats when said group adjusting means is in the night setting.

6. The combination of a temperature-regulating system including a plurality of thermostats each controlling the supply of heat to a corresponding room; group adjusting means common to said thermostats for setting them to maintain different temperatures during the day and during the night; individual setting means for each thermostat capable of suspending the setting made by said group adjusting means; individual light circuits for the various rooms; connections between the various light circuits and corresponding individual setting means, whereby the conditions of the various light circuits determine the settings of corresponding thermostats when said group adjusting means is in the night setting; and manually operable means for locking said thermostat at will in the day setting.

7. The combination of a temperature-regulating system including a plurality of thermostats each controlling the supply of heat to a corresponding room; group adjusting means common to said thermostats for setting them to maintain different temperatures during the day and during the night; individual setting means for each thermostat capable of suspending the settings made by said group adjusting means; individual light circuits for the various rooms; individual circuits each including a corresponding one of said individual setting means; and a plurality of circuit controlling switches each common to a light circuit and a corresponding one of the individual setting circuits.

8. The combination of a temperature-regulating system including a plurality of thermostats each controlling the supply of heat to a corresponding room; group adjusting means common to said thermostats for setting them to maintain different temperatures during the day and during the night; individual setting means for each thermostat capable of suspending the settings made by said group adjusting means; individual light circuits for the various rooms; individual circuits each including a corresponding one of said individual setting means; a plurality of circuit controlling switches each common to a light circuit and a corresponding one of the individual setting circuits; and individual manually operable means associated with each thermostat for locking the same at will in one setting.

9. The combination of a temperature-regulating system including a plurality of pneumatic thermostats each controlling the supply of heat to a corresponding room; means controlled by the intensity of pressure of the motive fluid supply to said thermostats serving to set said thermostats to maintain either of two characteristically different temperatures, one of which is a normal room temperature; individual setting means for each thermostat operable to set said thermostat for such normal room temperature; individual light circuits for the rooms; and connections between the various light circuits and corresponding individual setting means arranged to actuate the setting means to maintain normal temperature in a room upon the lighting of lights in said room.

10. The combination of a temperature-regulating system including a plurality of pneumatic thermostats each controlling the supply of heat to a corresponding room; means controlled by the intensity of pressure of the motive fluid supply to said thermostats serving to set said thermostats to maintain either of two characteristically different temperatures, one of which is a normal room temperature; individual setting means for each thermostat operable to set said thermostat for such normal room temperature; individual light circuits for the rooms; individual circuits each including a corresponding individual setting means; and a plurality of controlling switches, each switch controlling a light circuit and a corresponding one of said individual setting circuits.

11. The combination of a temperature-regulating system including a source of pressure motive fluid and a plurality of fluid pressure relay, thermostats each controlling the supply of heat to a corresponding room; means operated by the motive pressure fluid and arranged to shift the adjustment of said thermostats alternately between two settings, one of which is a normal room temperature; individual electrically actuated setting means for each thermostat serving when actuated to establish a normal room temperature adjustment; individual light circuits for the rooms; and connections between the various light circuits and corresponding individual adjusting means arranged to establish normal temperature in a room upon the lighting of lights therein.

12. The combination with a heating system including independently operable heating units delivering heat to the various rooms provided with corresponding thermostats having primary adjusting means by which they are adjustable as a group to maintain in said rooms a normal temperature during the day and a lower temperature during the night, of individual lighting circuits for the various rooms; individual secondary adjusting means for said thermostats; and connections between said secondary adjusting means and corresponding lighting circuits constructed and arranged to set individual thermostats to cause corresponding heating units to maintain the normal day temperature in any room in which the lights are lighted, regardless of the setting of the primary adjusting means.

In testimony whereof I have signed my name to this specification.

PARKER DODGE.